US012528949B2

(12) United States Patent
Haraldsson et al.

(10) Patent No.: US 12,528,949 B2
(45) Date of Patent: Jan. 20, 2026

(54) COATING INCLUDING PRIMER

(71) Applicant: MERCENE COATINGS AB, Stockholm (SE)

(72) Inventors: Tommy Haraldsson, Järfälla (SE); Carl Fredrik Carlborg, Stockholm (SE); Henrik Mikaelsson, Bandhagen (SE); Jonas Hansson, Stockholm (SE)

(73) Assignee: MERCENE COATINGS AB, Stockholm (SE)

( * ) Notice: Subject to any disclaimer, the term of this patent is extended or adjusted under 35 U.S.C. 154(b) by 296 days.

(21) Appl. No.: 17/792,687

(22) PCT Filed: Jan. 22, 2021

(86) PCT No.: PCT/EP2021/051426
§ 371 (c)(1),
(2) Date: Jul. 13, 2022

(87) PCT Pub. No.: WO2021/148588
PCT Pub. Date: Jul. 29, 2021

(65) Prior Publication Data
US 2023/0048969 A1 Feb. 16, 2023

(30) Foreign Application Priority Data

Jan. 24, 2020 (SE) .................................... 2050068-2
Oct. 8, 2020 (SE) .................................... 2051178-8

(51) Int. Cl.
*C09D 5/00* (2006.01)
*B05D 3/06* (2006.01)
(Continued)

(52) U.S. Cl.
CPC ............. *C09D 5/002* (2013.01); *B05D 3/067* (2013.01); *B05D 3/144* (2013.01); *B05D 7/02* (2013.01);
(Continued)

(58) Field of Classification Search
CPC ........ C09D 5/002; C09D 4/00; C09D 133/14; C09D 135/02; C09D 167/06;
(Continued)

(56) References Cited

U.S. PATENT DOCUMENTS 6,127,447 A 10/2000 Mitry et al.
6,582,754 B1 6/2003 Pasic et al.
(Continued)

FOREIGN PATENT DOCUMENTS

CN 106634543 5/2017
EP 0574352 12/1993
(Continued)

OTHER PUBLICATIONS

International Preliminary Report on Patentability for PCT Application No. PCT/EP2021/051426 mailed Sep. 24, 2021.
(Continued)

*Primary Examiner* — Robert S Walters, Jr.
(74) *Attorney, Agent, or Firm* — Branch Partners PLLC; Bruce E. Black

(57) ABSTRACT

There is provided a method of coating a substrate comprising applying a first mixture where the first mixture reacts to form covalent bonds to the substrate surface and where the unreacted parts of the first mixture undergo diffusive mixing with a second layer, which is applied on top of the first mixture. This avoids creation of a weak layer, which may otherwise give lower adhesion. The adhesion as well as mechanical properties including the scratch resistance are improved.

16 Claims, 1 Drawing Sheet

(51) Int. Cl.
*B05D 3/14* (2006.01)
*B05D 7/00* (2006.01)
*B05D 7/02* (2006.01)
*C03C 17/34* (2006.01)
*C08J 7/04* (2020.01)
*C08J 7/043* (2020.01)
*C09D 4/00* (2006.01)
*C09D 133/14* (2006.01)
*C09D 135/02* (2006.01)
*C09D 167/06* (2006.01)
*C09D 175/14* (2006.01)

(52) U.S. Cl.
CPC ............... *B05D 7/546* (2013.01); *B05D 7/58* (2013.01); *C03C 17/3405* (2013.01); *C08J 7/042* (2013.01); *C08J 7/043* (2020.01); *C09D 4/00* (2013.01); *C09D 133/14* (2013.01); *C09D 135/02* (2013.01); *C09D 167/06* (2013.01); *C09D 175/14* (2013.01); *C03C 2218/32* (2013.01); *C08J 2323/06* (2013.01); *C08J 2323/12* (2013.01); *C08J 2361/28* (2013.01); *C08J 2379/02* (2013.01); *C08J 2433/14* (2013.01); *C08J 2435/02* (2013.01); *C08J 2467/06* (2013.01); *C08J 2475/04* (2013.01)

(58) Field of Classification Search
CPC ......... C09D 175/14; C08J 7/043; C08J 7/042; C08J 2323/06; C08J 2323/12; C08J 2361/28; C08J 2379/02; C08J 2433/14; C08J 2435/02; C08J 2467/06; C08J 2475/04; B05D 3/067; B05D 3/144; B05D 7/02; B05D 7/546; B05D 7/58; C03C 17/3405; C03C 2218/32

See application file for complete search history.

(56) References Cited

U.S. PATENT DOCUMENTS

| | | |
|---|---|---|
| 2010/0178440 A1 | 7/2010 | Jahromi et al. |
| 2015/0024141 A1 | 1/2015 | Shukla |
| 2016/0369127 A1 | 12/2016 | Carlborg et al. |
| 2020/0085045 A1 | 3/2020 | Chan et al. |

FOREIGN PATENT DOCUMENTS

| | | |
|---|---|---|
| EP | 0618237 | 10/1994 |
| EP | 1230041 | 8/2002 |
| EP | 2371537 | 10/2011 |
| EP | 3296429 | 3/2018 |
| JP | 2019194016 | 11/2019 |
| SE | 1851613 | 6/2020 |
| WO | WO2009129171 | 10/2009 |
| WO | WO2018034614 | 2/2018 |
| WO | WO2019185302 | 10/2019 |
| WO | 2019/235108 | 12/2019 |

OTHER PUBLICATIONS

International Search Report and Written Opinion for PCT Application No. PCT/EP2021/051426 mailed May 6, 2021.

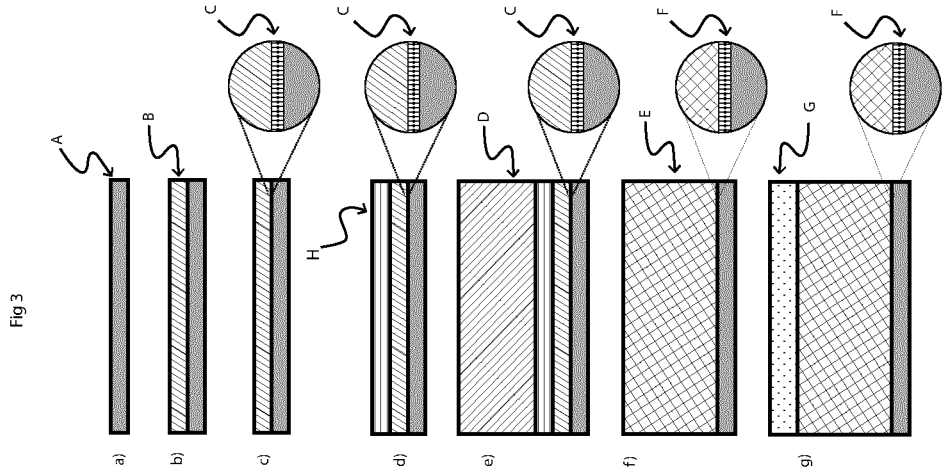
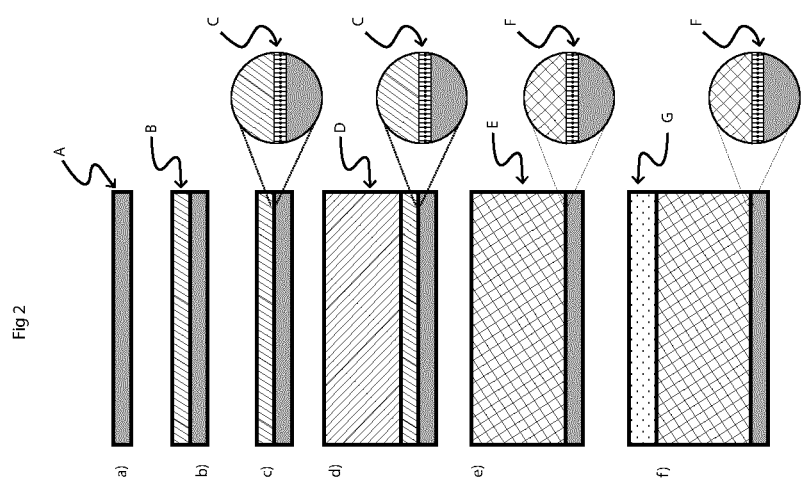
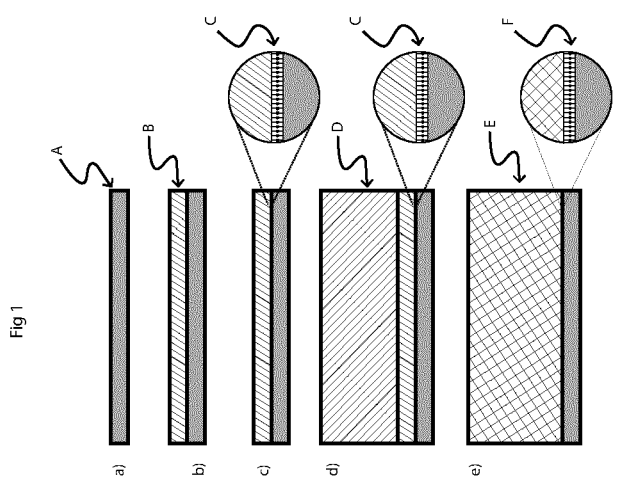

COATING INCLUDING PRIMER

CROSS-REFERENCE TO RELATED APPLICATIONS

This present application is a U.S. national stage application of PCT Application No. PCT/EP2021/051426, filed Jan. 22, 2021, which claims priority to Swedish Patent Application No. 2051178-8 filed Oct. 8, 2020 and Swedish Patent Application No. 2050068-2, filed Jan. 24, 2020, all of which are hereby incorporated by reference in their entirety.

TECHNICAL FIELD

The present invention relates to a coating system comprising a primer and a coating on the primer.

BACKGROUND

US 2010/178440 discloses a UV-curable binder which may be applied on a base material of melamine. A photoinitiator or possibly another initiating mechanism such as e-beam is present.

CN 106634543 discloses a UV-curing primer comprising acrylates which may be applied on melamine. A photoinitiator is present.

U.S. Pat. No. 6,582,754 discloses a process for coating a material surface, comprising the steps of: (a) covalently binding a compound comprising an ethylenically unsaturated double bond to the material surface; (b) polymerizing a monomer comprising a reactive or crosslinkable group on the surface and thereby providing a primary polymer coating comprising reactive or crosslinkable groups, (c) in case of a monomer comprising a reactive group in step (b) reacting the reactive groups of the primary coating with a further compound comprising an ethylenically unsaturated double bond and graft-polymerizing a hydrophilic monomer and optionally a co-monomer having a crosslinkable group onto the primary coating obtained according to step (b) and (d) in case of crosslinkable groups being present in step (b) or (c) initiating crosslinking of said groups.

EP 0 618 237 discloses a composition containing charge transfer complex from at least one unsaturated compound having an electron donor group and having an electron withdrawing group and being free of any photo initiating compound is polymerized by being subjected to ultraviolet light.

EP 2 371 537 discloses a coated metal material having at least three coating layers of a primer layer, middle coat layer, and top layer at least at part of a surface of the metal material, wherein said middle coat layer contains rutile-type titanium oxide in a solid volume concentration of 35 to 70%, said middle coat layer uses as a binder resin ingredient a polyester resin A with a number average molecular weight of 19000 to 28000, and a concentration of the polyester resin A in said binder resin ingredient is 20 mass % or more. There is disclosed that a mixed layer is formed at an interface, where the coatings slightly mix.

U.S. Pat. No. 6,127,447 discloses a radiation curable coating composition is provided and includes an effective amount of cationic photoinitiator, in combination with a charge transfer complex, the charge transfer complex comprising at least one electron withdrawing reactant component and at least one electron donating reactant component free radically reactive therewith, the electron withdrawing reactant component comprising an unsaturated nitrogen containing compound and the electron donating reactant component comprising an unsaturated compound having at least one vinyl ether group, the electron donating reactant component may be separate from or structurally incorporated within the electron withdrawing reactant component and an effective amount of a cationic photoinitiator.

WO 2019/185302 discloses a method of coating a substrate comprising at least one secondary amine, by contacting the substrate surface with a compound comprising at least one carbon-carbon double bond, wherein an electron withdrawing group is on at least one side of the carbon-carbon double bond, so that a complex is formed between nitrogen in the secondary amine and the carbon-carbon double bond. Then a reaction is initiated to form a covalent bond (C) by reaction of nitrogen in the secondary amine and the carbon-carbon double bond, by subjecting at least a part of the formed complexes to actinic radiation, wherein the wavelength of the actinic radiation is adapted to be absorbed by the complex. When a further top-coat is added, the resulting surface has a high hardness, and the scratch resistance is improved.

Problems in connection with primers and top-coats in the prior art include that the adhesion can be improved and that the mechanical properties differ in the various layers so that the substrate may for instance be hard, the primer layer may be soft and the top-coat may be hard. For example, in the case of polymers that exhibits shrinkage during polymerization, a hard top coating on a hard substrate typically requires a soft primer layer to compensate for shrinkage stress caused during polymerization of the hard top, which otherwise would cause poor adhesion to the substrate.

SUMMARY

It is an object of the present invention to obviate at least some of the disadvantages in the prior art and to provide an improved coating.

In a first aspect there is provided a method of coating a substrate (A), said method comprising the steps of
 a) providing a substrate (A), said substrate (A) comprising at least a first type of chemical groups, at least a fraction of the at least first type of chemical groups is at the surface of the substrate (A),
 b) applying a layer (B) of a first mixture on the substrate (A) surface, said first mixture comprising a compound comprising at least a second type of chemical groups, wherein the first type of chemical groups have the ability to react with the second type of chemical groups to form a covalent bond,
 c) initiating a reaction to form a covalent bond (C) by reaction of the first type of chemical groups and the second type of chemical groups, wherein a layer of a reacted first mixture is formed from the first mixture excluding the second type of chemical groups which are covalently bound,
 d) applying a layer (D) of a second mixture on the layer of reacted first mixture, wherein the reacted first mixture and the second mixture are able to undergo diffusive mixing so that the concentration calculated by weight of any compound in the reacted first layer deviates at most 10% from the concentration of the same compound calculated in both the layer of the reacted first mixture and the layer of the second mixture taken together, within 1 minute after application of the layer (D) of the second mixture at 20° C., wherein a resulting mixture of the reacted first mixture and the second mixture is able to form a coating after curing, e) curing the resulting mixture of the reacted first mixture and the second mixture to form a coating.

In a second aspect there is provided a substrate (A) coated according to the method above.

The inventors have found that by selecting the first and second mixtures so that the first and second mixtures can diffuse rapidly into each other and thereby undergo diffusive mixing, it is possible to avoid a weak layer below the top coat. A normal primer has to use the same chemistry for adhesion as well as for film formation. This means a compromise with the mechanical properties of the primer layer in a conventional coating system. The primer in such system is often deliberately made soft to gain adhesion properties through stress relaxation. By separating the adhesion mechanism from film formation, the current invention can avoid the compromises which a conventional primer has built in.

During diffusive mixing the unreacted parts of the first mixture will diffuse into to second mixture thereby avoiding a layer of unreacted molecules under the top-coat which otherwise would have created a weak layer.

The adhesion is improved since a weak layer is avoided. Further the cured coating is attached to the substrate (A) surface via the formed covalent bonds (C) creating a strong adhesion.

The mechanical properties of the coating can be made virtually homogenous throughout the thickness of the coating since remaining unreacted parts of the first mixture will diffuse into the second layer where it will be diluted and not causing any noticeable negative effects. A softer primer layer is avoided.

By using the present invention, the mechanical properties of the cured second mixture (including the diffused chemicals from the first mixture) can be optimized for good performance, e.g. by trying to match the mechanical properties of the substrate (A).

A washing step after the curing of the primer is avoided, so that the top-coat can be applied directly without a washing step to remove unreacted remaining components of the primer. Such unreacted remaining components of the primer will instead diffuse into the top-coat where they will not cause any noticeable negative effects.

BRIEF DESCRIPTION OF THE DRAWINGS

Aspects and embodiments will be described with reference to the following drawings in which:

FIG. 1 shows
a) A substrate (A) comprising at least a first type of chemical groups, at least a fraction of the at least first type of chemical groups is at the surface of the substrate (A).
b) A layer (B) of a first mixture comprising a compound with at least a second type of chemical groups is applied on the substrate (A) surface.
c) The second type of chemical groups in the first mixture reacts with the first type of chemical groups in the surface to form a covalent bond (C) at the interface, but leaves the bulk of the first layer liquid. There is a layer of reacted first mixture excluding the second type of chemical groups which are covalently bound. This layer is above the covalent bonds (C).
d) A layer (D) of a second mixture is applied on the substrate (A) surface. The second mixture is able to form a solid coating after curing. The layer (D) of the second mixture can be of the same thickness as the first layer (B), much thinner or much thicker.
e) All the molecules of the first mixture and the second mixture, except the molecules of the first mixture that have formed covalent groups with the surface, are able to diffuse and mix to form a new mixture (E) that is cured to form a partially or fully cured single layer, covalently linked to the surface (F). The resulting mixture (E) is also curable.

FIG. 2 shows
a) A substrate (A) comprising at least a first type of chemical groups, at least a fraction of the at least first type of chemical groups is at the surface of the substrate (A).
b) A layer (B) of a first mixture comprising a compound with at least a second type of chemical groups is applied on the substrate (A) surface.
c) The second type of chemical groups in the first mixture reacts with the first type of chemical groups in the surface to form covalent bonds (C) at the interface, but leaves the bulk of the first layer liquid. There is a layer of reacted first mixture excluding the second type of chemical groups which are covalently bound. This layer is above the covalent bonds (C).
d) A layer (D) of a second mixture is applied on the substrate (A) surface. The second mixture is able to form a solid coating after curing. The layer (D) of the second mixture can be of the same thickness as the first layer (B), much thinner or much thicker.
e) All the molecules of the first mixture and the second mixture, except the molecules of the first mixture that have formed covalent groups with the surface, are able to diffuse and mix to form a new mixture (E) that is cured to form a partially or fully cured single layer, covalently linked (F) to the surface.
f) One or more additional layer(s) (G) of mixtures that can form solid coatings are in one embodiment applied on the substrate (A) and cured to a partially or fully cured layers.

FIG. 3 shows
a) A substrate (A) comprising at least a first type of chemical groups, at least a fraction of the at least first type of chemical groups is at the surface of the substrate (A).
b) A layer (B) of a first mixture comprising a compound with at least a second type of chemical groups is applied on the substrate (A) surface.
c) The second type of chemical groups in the first mixture reacts with the first type of chemical groups in the surface to form covalent bonds (C) at the interface, but leaves the bulk of the first layer liquid. There is a layer of reacted first mixture excluding the second type of chemical groups which are covalently bound. This layer is above the covalent bonds (C).
d) Optionally, one or several layers (H) of an intermediate mixture is applied. The intermediate mixture is not cured and can either evaporate, or mix with the first mixture. This step d) can be repeated several times to apply layers (H) of different mixtures that do not form a cured layer. Additionally, parts of the layer C or C and H can be removed at one or several of these stages.
e) One or more layers (D) of a second mixture is applied on the substrate (A) surface. The mixture (E) of the first mixture, the second mixture and the intermediate mixture is able to form a solid coating after curing. The mixture (E) is obtained by diffusive mixing.
f) All the molecules of the first mixture and the second mixture(s) and the intermediate mixture(s), except the molecules of the first mixture that have formed covalent groups with the surface, are able to diffuse and mix to form a new mixture (E) that is cured to form a partially or fully cured single layer with close to homogeneous mechanical properties, covalently linked to the surface.

g) Optionally one or more additional layer (G) of mixtures that can form solid coatings are applied on the substrate (A) and cured to a partially or fully cured layers (G).

DETAILED DESCRIPTION

Before the invention is disclosed and described in detail, it is to be understood that this invention is not limited to particular compounds, configurations, method steps, substrates, and materials disclosed herein as such compounds, configurations, method steps, substrates, and materials may vary somewhat. It is also to be understood that the terminology employed herein is used for the purpose of describing particular embodiments only and is not intended to be limiting since the scope of the present invention is limited only by the appended claims and equivalents thereof.

It must be noted that, as used in this specification and the appended claims, the singular forms "a", "an" and "the" include plural referents unless the context clearly dictates otherwise.

If nothing else is defined, any terms and scientific terminology used herein are intended to have the meanings commonly understood by those of skill in the art to which this invention pertains.

As used herein (meth)acrylate is a general term that encompasses both acrylate and methacrylate.

In the first aspect there is provided a method of coating a substrate (A), said method comprising the steps of
  a) providing a substrate (A), said substrate (A) comprising at least a first type of chemical groups, at least a fraction of the at least first type of chemical groups is at the surface of the substrate (A),
  b) applying a layer (B) of a first mixture on the substrate (A) surface, said first mixture comprising a compound comprising at least a second type of chemical groups, wherein the first type of chemical groups has the ability to react with the second type of chemical groups to form a covalent bond,
  c) initiating a reaction to form a covalent bond (C) by reaction of the first type of chemical groups and the second type of chemical groups, wherein a layer of a reacted first mixture is formed from the first mixture excluding the second type of chemical groups which are covalently bound,
  d) applying a layer (D) of a second mixture on the layer of reacted first mixture, wherein the reacted first mixture and the second mixture are able to undergo diffusive mixing so that the concentration calculated by weight of any compound in the reacted first layer deviates at most 10% from the concentration of the same compound calculated in both the layer of the reacted first mixture and the layer of the second mixture taken together, within 1 minute after application of the layer (D) of the second mixture at 20° C., wherein a resulting mixture of the reacted first mixture and the second mixture is able to form a coating after curing,
  e) curing the resulting mixture of the reacted first mixture and the second mixture to form a coating.

The substrate (A) surface comprises a first type of chemical groups and a compound in the first mixture comprises a second type of chemical groups. The first mixture is applied to the substrate (A) surface, or at least a part of the substrate (A) surface.

In one embodiment, the first mixture consists essentially of one compound comprising a second type of chemical groups. I.e. the first mixture can be an essentially pure liquid of only one compound. In other embodiments the first mixture is a solution comprising more than one compounds. The first mixture always comprises a compound comprising a second type of chemical groups. The second type of chemical groups can react with the first type of chemical groups. The first type of chemical groups are at the surface of the substrate (A) and after the reaction a covalent bond (C) is formed so that the molecules comprising the second type of chemical groups become covalently bound to the substrate (A) surface. In this respect this step can be seen as a surface modification.

The applied layer (B) of the first mixture is in one embodiment relatively thin compared to the layer (D) of top-coat. The applied layer (B) of the first mixture is in one embodiment 0.1-10 µm thick before curing.

The layer (B) of the first mixture is reacted where the first type of chemical groups react with the second type of chemical groups. This reaction can be initiated in several ways. In one embodiment, the reaction is initiated by irradiation with actinic radiation, such as for instance UV-radiation. In one embodiment, a photo initiator is added to the first mixture to facilitate the initiation of the reaction. In an alternative embodiment, another initiation mechanism is used. An example of another initiation mechanism includes but is not limited to a heat initiated reaction typically including a heat activated initiator. An example of another initiation mechanism is a reaction with a low activation energy wherefore a spontaneous chemical reaction occurs as chemical (A) and chemical (B) meet. A further example of initiation mechanism is e-beam, including for the curing of the second mixture. Any suitable initiation mechanism as known in the prior art can be used to initiate the reaction. This applies to both the first mixture and the second mixture.

The first layer (B) and the second layer (D) mix to form a mixed layer (E) by diffusive mixing. The mixing is so thorough that the concentration of any compound does not deviate more than 10% calculated by weight from the average concentration in the layer (E) in any macroscopic volume of the layer (E). This applies after 1 minute after application of the second layer (D) and at 20° C.

When the reaction is finished a certain fraction of the molecules comprising the first and second chemical groups will have reacted. Typically, there will be remaining unreacted molecules comprising the second type of chemical groups. The unreacted part of the first mixture is called the reacted first mixture and this part is not covalently bound to the substrate (A). The mixture is applied on the surface, whereby some molecules in the mixture react and after the reaction the mixture is called the reacted first mixture. The groups and compounds which are covalently bound to the substrate (A) are not included in the reacted first mixture. Also other optional additives and components of the first mixture typically remain after the reaction. All or a great fraction of all remaining parts in the first mixture will during the diffusive mixing diffuse into the applied layer of the second mixture. A high fraction of compounds of the first mixture which are not covalently bound to the substrate (A) should diffuse into the applied second mixture. The extent of the diffusive mixing is considered after 1 minute after application of the top-coat and at 20° C. In the volume which was the reacted first layer the concentration of any compound (except compounds covalently bound to the surface) should deviate at most 10% from the concentration calculated on the entire volume of the reacted first layer and the applied layer (D) of the second mixture. The concentration is calculated by weight.

During the reaction in step c) the composition of the first mixture will change due to the reaction as well as possible initiation mechanisms. After the reaction in step c) the mixture is called the reacted first mixture.

The layer (D) of the second mixture is in one embodiment applied essentially on the parts of the substrate (A) surface where the first mixture has been applied in the previous steps. In one embodiment, the entire substrate (A) surface is treated, in an alternative embodiment a part of the substrate (A) surface is treated.

When a great fraction of the remaining parts of the first mixture have diffused into the second layer, then the concentration gradient decreases and the diffusion rate will slow down. Diffusive mixing is the process where compounds diffuse in the direction of a lower concentration of that compound. For instance, compounds with higher concentration in the first layer will diffuse into the second layer and vice versa.

The components of the first and second mixtures are in one embodiment selected so that the components of the first mixture will spontaneously diffuse into the second mixture when the second mixture is applied. Also other embodiments of the diffusive mixing are encompassed.

In order to obtain a sufficiently high diffusion rate the first and second mixtures should not have too high a viscosity. The components of the first and second mixtures should not have too high molecular weight. In one embodiment, the viscosity of the first mixture is 10 Pas or lower at the temperature where diffusive mixing occurs. In one embodiment the components of the second mixture should not have too high molecular weight. In one embodiment, the viscosity of the second mixture is 10 Pas or lower at the temperature where diffusive mixing occurs.

In one embodiment, the layer (B) of the first mixture is thinner than the layer (D) of the second layer and in an alternative embodiment the layer (B) of the first mixture is thicker than the layer (D) of the second layer.

The components of the first mixture should in one embodiment be compatible with the components of the second mixture to allow efficient diffusion. Monomers commonly used in UV curing acrylate formulations, including but not limited to HDDA (Hexane diol diacrylate), TMPTA (trimethylolpropane triacrylate), GPTA (propoxylated glycerol triacrylate), TEGDA Triethyleneglycol diacrylate) will in general be good choices since they will be miscible with oligomers and monomers in the subsequent coating. Low viscosity oligomers such as multifunctional acrylates based on polyols are also feasible. Alternatively, the solvating power of the subsequent layer is increased by dilution with a good solvent such as acetone, isopropyl alcohol etc, which facilitates diffusion of the unreacted primer components and evaporates before the cure of the subsequent layer to afford good mechanical properties after cure. Alternatively, heating is used to increase the diffusive mixing rate.

As a final step the applied second mixture is cured. This creates a top coat. Alternatively, further coatings may be applied to form the finished coating.

In one embodiment, the substrate (A) comprises at least one selected from the group consisting of melamine formaldehyde resin, urea formaldehyde resin, poly paraphenylene terephthalamide, polyamide, polyethylene, PMMA, polycarbonate, cyclic olefin copolymers, polyester, polyurethane, acrylonitrile butadiene styrene copolymer (ABS), PVC, polybutadiene, blends of olefins sourced from recycled plastics, a compound comprising at least one abstractable hydrogen atom, and polypropene. As long as there are chemical groups in the substrate (A) and chemical groups on molecules in the first mixture that can react and form a covalent bond, any substrate (A) can be used.

In one embodiment the substrate comprises a polyolefin and at least a part of a surface of the substrate (A) before step b) is treated in the presence of oxygen with at least one method selected from plasma treatment, corona treatment and flame treatment, to obtain a peroxy radical on the surface, wherein the first mixture applied in step b) comprises at least one compound comprising an abstractable hydrogen, so that the peroxy radical on the surface reacts with the at least one compound comprising an abstractable hydrogen to form a peroxide on the surface, wherein step c) has to effect to decompose at least a part of the peroxide on the surface to obtain a surface tethered alkoxy radical and a free hydroxy radical, whereby the surface tethered alkoxy radical reacts with the second type of chemical groups to form the covalent bond (C) by reaction of the surface tethered alkoxy radical and the second type of chemical groups, whereby the layer (B) of the first mixture becomes a layer of a reacted first mixture which excludes the second type of chemical groups which are covalently bound. Without wishing to be bound by any particular scientific theory the inventors believe that as plasma/corona/flame impact the surface, peroxy radicals are quickly formed. In the presence of compounds capable of donating a hydrogen, peroxides are formed on the surface. Peroxides are sensitive to UV light and will decompose into a surface tethered alkoxy radical and a free hydroxy radical when a light quantum with sufficient energy is absorbed by the peroxide. The surface tethered alkoxy radical is not sensitive to atmospheric oxygen and will combine via a radical mediated step with an acrylate, methacrylate, maleate/fumarate, vinyl ether and other reactive groups known to react via peroxide initiation. In the case of a monomer/oligomer with a functionality above 1 the effect is that a reactive group on the monomer is reacted with the surface and the remaining reactive groups are tethered to the surface via the monomer/oligomer backbone. The thus formed surface with tethered reactive groups is very useful for improved adhesion to subsequent layers that have functional groups suitable for reaction with the tethered functional group.

In one embodiment, the first type of chemical groups is a secondary amine and wherein the second type of chemical groups is a carbon-carbon double bond with an electron withdrawing group on at least one side of the carbon-carbon double bond. In one embodiment, wherein the electron withdrawing group is at least one selected from the group consisting of a triflyl group, a trihalide group, a cyano group, a sulfonate group, a nitro group, an ammonium group, an aldehyde group, a keto group, a carboxylic group, an acyl chloride group, an ester group, an amide group, and ether group, and a halide. In one embodiment, the compound comprising at least one carbon-carbon double bond is at least one selected from the group consisting of maleic anhydride and maleimide. In one embodiment, the compound comprising at least one carbon-carbon double bond is at least one selected from the group consisting of a maleate and a fumarate. In one embodiment, the compound comprising at least one carbon-carbon double bond is at least one selected from the group consisting of an acrylate and a methacrylate.

In an alternative embodiment, the first type of chemical groups is an OH-group and wherein the second type of chemical groups is a silane ($Si_nH_{2n+2}$). The silane can then react with OH-groups on the surface.

In another alternative embodiment, the first type of chemical groups is an abstractable hydrogen and wherein the second type of chemical groups is a group with the ability to abstract a hydrogen. An abstractable hydrogen is able to participate in a chemical reaction in which a hydrogen atom is abstracted from a substrate (A). The group with the ability to abstract a hydrogen is in one embodiment a radical species itself and may be initiated by UV-radiation. In another embodiment, the photoinitiator is able to form a long lived triplet state capable of abstracting a hydrogen atom. Thus a suitable UV initiator may be used to initiate such a reaction.

In one embodiment, the reaction in step c) is initiated with actinic radiation.

In one embodiment, the substrate (A) is an olefin, where examples of suitable olefins include but are not limited to polypropylene and polyethylene. The primer, i.e. the first mixture in such an embodiment comprises a compound capable of abstracting a hydrogen from the substrate (A) causing an unpaired electron (radical) to be located on the olefinic chain. The radical subsequently reacts or is paired with components in the primer, for example a (meth)acrylate or a persistent or latent source with a radical character such as atmospheric oxygen resulting in a covalent bond between the substrate (A) and primer components either directly or in subsequent reactions potentially initiated by components in the subsequently applied layer.

In one embodiment, the viscosity of the first mixture is 10 Pas or lower measured at the temperature where diffusive mixing occurs. In one embodiment, the viscosity of the second mixture is 10 Pas or lower measured at the temperature where diffusive mixing occurs. The lower viscosity facilitates the diffusive mixing.

In one embodiment, the first mixture and the second mixture have different viscosities.

In one embodiment, the first mixture and the second mixture are the same and wherein one of the applied layers is thinner than the other. In such an embodiment, oxygen in the ambient air may be utilized to inhibit an initiator in the thinner layer so that the reaction occurs to a desired extent.

In one embodiment at least one additional layer (G) is added, which additional layer (G) is able to form a solid coating. Thus several coating layers can be added to form a finished coated substrate.

In one embodiment at least one intermediate layer (H) is added after step c) and before step d). This intermediate layer can for instance be a solvent or another compound or mixture. Subsequently in the process the intermediate layer (H) mixes with the first layer and the second layer so as to form a resulting mixture (E), which can be cured.

In one embodiment each molecule of the compound in the first mixture comprises at least two chemical groups of the second type. Thus in one embodiment the compound in the first mixture is difunctional with respect to the second type of chemical groups.

In one embodiment only a fraction of the chemical groups of the second type are reacted in step c). The bulk of the layer (B) of the first mixture is in one embodiment essentially unreacted during step c).

In a second aspect there is provided a substrate (A) coated according to the method as outlined above.

There is the possibility to form patterns on the substrate (A) by only applying the mixtures on parts of the surface. In the case of irradiation curing, the possibility to form patterns on the substrate (A) can also be achieved by only irradiating parts of the surface, for example by UV photo patterning.

Other features and uses of the invention and their associated advantages will be evident to a person skilled in the art upon reading the description and the examples.

It is to be understood that this invention is not limited to the particular embodiments shown here. The embodiments are provided for illustrative purposes and are not intended to limit the scope of the invention since the scope of the present invention is limited only by the appended claims and equivalents thereof.

EXAMPLES

Example 1

One of the following primers were applied on a black melamine-formaldehyde substrate in a 6 μm thick layer with a wire rod. The primers were applied in a first mixture diluted 1:4 in acetone. After curing this gave about 1 g/m².

The primer was cured using UV in room temperature.

After curing of the primer a top-coat (BONA UE 1664) was applied. The top-coat was applied in an amount of 6 g/m².

For the different samples the X-hatch and Hamberger Kobel values were measured. Hamberger Industriewerke has developed a testing device called the "Hamberger Planer", which can be used to conduct a "coin test" under defined conditions. A piece of metal with a coin-like edge is pushed across the covered surface at a pre-definable pressure. The test result will be the maximum force to be applied until arriving at the appearance of first white marks. It is indicated/expressed in Newton.

The x-hatch measured the coating adhesion according to ISO 2409. According to ISO 2409, the scale is 0-5 where "0" represents the best, and "5" represent the worst adhesion performance.

Before application the viscosity of the primer, i.e. the first mixture was measured.

The measurement results are shown in the table below.

| Oligomer | Type | M.W. | Viscosity mPas | X-hatch | Hamb. |
|---|---|---|---|---|---|
| Laromer ® PE56F (BASF) | Polyester acrylate | | 20-40 | "5" | <10N |
| Laromer ® PE56F (BASF), with 30 min duration between top application and curing | Polyester acrylate | | 20-40 | "5" | <10N |
| EBECRYL ® 2221 (ALLNEX) | Urethane acrylate | 1200 | 21 | "5" | <10N |
| CN2601 (ARKEMA) | Polyester acrylate | | 20-30 | "5" | 15N |
| EBECRYL ® 4101 (ALLNEX) | Urethane acrylate | | 7 | "1" | 30-35N |
| CN736 (ARKEMA) | Chlorinated Polyester acrylate in 40% TMPTA | | 1.5 | "0" | 35N |
| UCECOAT ® 2501 (ALLNEX) | Aliphatic polyurethane acrylate dispersion | | | "0" | 20N |

Laromer® PE56f is a liquid polyester modified acrylic resin intended for the formulation of energy curable coatings.

EBECRYL® is an Aromatic urethane acrylate with molecular weight Mn 1200.

CN2610 by Sartomer Arkema Group is a polyester acrylate oligomer. It is difunctional and intended for use in ultra violet and electron beam curing compositions.

EBECRYL® 4101 is an undiluted, unsaturated aliphatic urethane acrylate designed for coatings.

CN736 is a chlorinated polyester acrylate oligomer.

UCECOAT® 2501 is an Aliphatic polyurethane acrylate dispersion.

It can be concluded that for the primer (first mixture) with low viscosity the unreacted parts of the first mixture could diffuse into the top-coat and thereby avoid the weak layer. The more viscous primers (first mixtures) did not diffuse into the top-coat (second mixture) to the same extent and thereby created a weak layer of unreacted primer or a weak layer due to an unfavorable monomer/oligomer composition with respect to mechanical properties.

Example 2

0, 1, 2 or 3 wt % Omnirad 819 in Hexane diol diacrylate (HDDA) was used in different tests. Omnirad 819 is Phenylbis(2,4,6-trimethylbenzoyl)phosphine oxide. The samples were applied on a black melamine substrate in a 6 μm thick layer with a wire rod. The substances were applied in a first mixture diluted 1:4 in acetone. After curing this gave about 1 g/m2.

The primer was cured using UV in room temperature.

After curing of the primer a top-coat was applied. Bona 1664. The top-coat was applied in an amount of 6 g/m².

The results are shown in the below table.

| Monomer | Omni. 819 | Hamb. | Cross hatch | Primer film friction |
|---|---|---|---|---|
| HDDA | 0 wt % | 48+ | 0 | Very low |
| HDDA | 1 wt % | 48+ | 0 | Very low |
| HDDA | 2 wt % | 48+ | 0 | Very low |
| HDDA | 3 wt % | 40-48 | 0 | Slight friction |

It can be concluded that film formation of the primer before the top-coat is applied gives impaired scratch resistance as measured according to the Hamberger test. This effect is attributed to the formation of a weakening intermediate layer below the top-coat.

Example 3

Polyethylene substrate used was "PE 1000 platta natur thickness 8 mm" from Nordbergs Tekniska AB, Sweden.

HDDA was applied as a primer 1 g/m². It was exposed to 1.3 J UV light from a mercury lamp.

The primer layer was surface wet after the exposure.

A top coat from Bona AB, UE 1664, was applied with a 6 μm rod applicator. The top coat was exposed to 1.3 J UV light in the same way as the primer.

The sample was cooled to 30° C. and cross hatch test was performed. Cross hatch=0 was achieved.

A reference without primer was made; UE1664 was applied as described above. Cross hatch result=5

Example 4

A 28 mm wide polypropylene edge band from Egger GmbH was used as substrate.

Primers tried were Sartomer SR9020 (trifunctional acrylate), Sartomer SR 350D (trifunctional methacrylate) both from Arkema, and Visiomer 1,6-HDDMA (difunctional methacrylate) from Evonik.

The top coat was UE1664 from Bona AB.

The primers were exposed to UV light according to the below table. The top coat was applied with a 6 μm rod applicator and cure with 1.3 J UV light. CH=cross hatch.

| Primer: | SR9020 | SR350D | HDDMA | No primer |
|---|---|---|---|---|
| 250 mJ | CH = 0 | CH = 0 | CH = 0 | CH = 4 |
| 500 mJ | CH = 0 | CH = 0 | CH = 0 | |
| 750 mJ | CH = 0 | CH = 0 | CH = 0 | |
| 1000 mJ | CH = 0 | CH = 0 | CH = 0 | |

A reference sample was made without primer. The cross hatch result for this sample was 5.

Example 5

Standard microscopy slide glass (25 mm×75 mm) from VWR was used as substrate, washed with water before use.

Primers were HDDA (Hexane diol diacrylate from Arkema, SR238) and CN2610 (a polyester acrylate from Akrkema), both with with 10% maleic acid and 1% Silquest A-174NT silane (a methacryloxy functional trimethoxy silane).

The top coat was UE1664 from Bona AB.

The primers were applied on the glass approx. 3 g/m², (approx. 22 μl/glass slide) and incubated in room temperature overnight.

The top coat was applied with a 6 μm rod applicator and cure with 1.3 J UV light from a mercury lamp. The sample was cooled to 30° C. and cross hatch test was performed.

| Primer | Type | Viscosity mPas | X-hatch |
|---|---|---|---|
| CN2610 with 10% maleic acid and 1% A-174NT | Polyester acrylate | 20-30 | "5" |
| HDDA with 10% maleic acid and 1% A-174NT | | 9 | "0" |
| No primer | — | — | "5" |

To investigate if diffusive mixing has occurred in the above case, similar samples was examined before curing using FTIR.

Three glass slides were prepared, sample 1 with one with only top coat (Bona 1664) at approx. 12 g/m², sample 2 with only primer (HDDA with 10% maleic acid and 1% A-174NT) approx. 12 g/m², and sample 3 with both primer (approx. 3-12 g/m²) and top coat (approx. 6-12 g/m²). All samples were analysed within minutes of application.

The IR-spectra showed that the sample with primer and top coat had a largely similar spectrum to pure top coat, with additional peaks that were also present in the pure primer sample. For illustrative purpose, we investigated the peak at 1781 cm$^{-1}$ (the peak was present for sample 2 with only primer and for sample3 with primer and top coat, but flat for sample 1 with only top coat) that represent the carbonyl group in the maleic anhydride. After baseline correction of the spectra, we measured the height at 1781 cm$^{-1}$, see table below.

|  | Primer | Top coat | IR peak at 1851 cm$^{-1}$ [A.U.] |
|---|---|---|---|
| Sample 1 | — | 12 μm Bona 1664 | 0 |
| Sample 2 | 12 μm HDDA with 10% maleic acid and 1% A-174NT | — | 0.037 |
| Sample 3 | 3-12 μm HDDA with 10% maleic acid and 1% A-174NT | 6-12 μm Bona 1664 | 0.010 |

The facts that the carbonyl group in the maleic anhydride is visible in sample 2 and sample 3, but not in sample 3, and that sample 1 and sample 3 had very similar spectra confirms that mixing of the primer and top coat has occurred in sample 3.

Example 6

Comparative PET

A thin film of Mylar (BoPET) was cut into two pieces and used as substrates. Sartomer SR9020 (trifunctional acrylate) was applied as a primer 1.5 g/m2 to one of the substrates and subsequently exposed to 1.4 J UV light from a mercury lamp. Both of the substrates were applied with a top coat from Bona AB, UE 1664, applied with a 22 μm rod applicator. The top coat was exposed to 1.4 J UV light in the same way as the primer. The sample was cooled to room temperature and cross hatch test was performed. The results are presented in the below table.

TABLE 1

| Primer | Cross hatch |
|---|---|
| yes | CH = 4 |
| no | CH = 0 |

Example 7

Corona PP

Two polypropylene (PP) substrates was used, one uncoloured ("PP platta natur" with thickness of 10 mm) and one black substrate ("PP platta svart" with thickness of 3 mm), both bought from Nordbergs Tekniska AB, Sweden.

Some of the substrate were exposed to corona treatment using a handheld Laboratory Corona Treater (Model BD-20, from Electro-technic products inc.), moving the electrode on a distance of 5-10 mm over 30 cm2 large substrate for 40 s.

Sartomer SR9020 (trifunctional acrylate) was applied as a primer 1.5 g/m2 to some of the substrates and subsequently exposed to 1.4 J UV light from a mercury lamp. All of the substrates were applied with a top coat from Bona AB, UE 1664, applied with a 22 μm rod applicator. The top coat was exposed to 1.4 J UV light in the same way as the primer. The sample was cooled to room temperature and cross hatch test was performed. The results are presented in the below table.

TABLE 2

| Substrate | Corona | Primer | Cross hatch |
|---|---|---|---|
| PP (uncolored) | no | no | CH = 5 |
| PP (uncolored) | no | yes | CH = 5 |
| PP (uncolored) | yes | yes | CH = 1 |
| PP (black) | no | no | CH = 5 |
| PP (black) | no | yes | CH = 5 |
| PP (black) | yes | yes | CH = 0 |

The invention claimed is:

1. A method of coating a substrate (A), said method comprising the steps of
    a) providing a substrate (A), said substrate (A) comprising at least a first type of chemical groups, at least a fraction of the first type of chemical groups is at the surface of the substrate (A),
    b) applying a layer (B) of a first mixture on the surface of the substrate (A), said first mixture comprising a compound comprising at least a second type of chemical groups, wherein the first type of chemical groups have the ability to react with the second type of chemical groups to form a covalent bond (C),
    c) initiating a reaction to form the covalent bond (C) by reaction of the first type of chemical groups and the second type of chemical groups, wherein a reacted layer of a reacted first mixture is formed from the first mixture, wherein the reacted first mixture excludes those molecules of the compound that comprise at least the second type of chemical groups which are covalently bound to the substrate,
    d) applying a layer (D) of a second mixture on the reacted layer of the reacted first mixture with the reacted first mixture and the second mixture diffusively mixing so that the concentration calculated by weight of any compound in the reacted layer of the reacted first mixture deviates at most 10% from the concentration of the same compound calculated in both the reacted layer of the reacted first mixture and the layer of the second mixture taken together, within 1 minute after application of the layer (D) of the second mixture at 20° C.,
    e) curing the resulting mixture of the reacted first mixture and the second mixture to form a coating.

2. The method according to claim 1, wherein the substrate (A) comprises at least one selected from the group consisting of melamine formaldehyde resin, urea formaldehyde resin, poly paraphenylene terephthalamide, polyamide, polyethylene, PMMA, polycarbonate, cyclic olefin copolymers, polyester, polyurethane, acrylonitrile butadiene styrene copolymer (ABS), PVC, polybutadiene, blends of olefins sourced from recycled plastics, a compound comprising at least one abstractable hydrogen atom, and polypropene.

3. The method according to claim 1, wherein the first type of chemical groups is a secondary amine and wherein the second type of chemical groups is a carbon-carbon double bond with an electron withdrawing group on at least one side of the carbon-carbon double bond.

4. The method according to claim 3, wherein the electron withdrawing group is at least one selected from the group consisting of a triflyl group, a trihalide group, a cyano group, a sulfonate group, a nitro group, an ammonium group, an aldehyde group, a keto group, a carboxylic group, an acyl chloride group, an ester group, an amide group, and ether group, and a halide.

5. The method according to claim 3, wherein the compound comprising at least one carbon-carbon double bond is at least one selected from the group consisting of maleic anhydride and maleimide.

6. The method according to claim 3, wherein the compound comprising at least one carbon-carbon double bond is at least one selected from the group consisting of a maleate and a fumarate.

7. The method according to claim 3, wherein the compound comprising at least one carbon-carbon double bond is at least one selected from the group consisting of an acrylate and a methacrylate.

8. The method according to claim 1, wherein the first type of chemical groups is an abstractable hydrogen and wherein the second type of chemical groups is a group with the ability to abstract a hydrogen.

9. The method according to claim 1, wherein the reaction in step c) is initiated with actinic radiation.

10. The method according to claim 1, wherein the viscosity of the first mixture is 10 Pa*s or lower at the temperature where diffusive mixing occurs.

11. The method according to claim 1, wherein the first mixture and the second mixture have different viscosities.

12. The method according to claim 1, wherein the first mixture and the second mixture are the same and wherein one of the applied layers is thinner than the other.

13. The method according to claim 1, wherein at least one additional layer (G) is added, which additional layer (G) is able to form a solid coating.

14. The method according to claim 1, wherein at least one intermediate layer (H) is added after step c) and before step d).

15. The method according to claim 1, wherein each molecule of the compound in the first mixture comprises at least two chemical groups of the second type.

16. The method according to claim 1, wherein only a fraction of the chemical groups of the second type are reacted in step c).

* * * * *